United States Patent
Inoue

(10) Patent No.: US 8,798,473 B2
(45) Date of Patent: Aug. 5, 2014

(54) OPTICAL SIGNAL LEVEL ADJUSTMENT SYSTEM, INFORMATION ANALYSIS/CONTROL SIGNAL GENERATION APPARATUS IN THE SAME SYSTEM, AND INFORMATION ANALYSIS/CONTROL SIGNAL GENERATION METHOD

(75) Inventor: Takanori Inoue, Tokyo (JP)

(73) Assignee: NEC Corporation, Tokyo (JP)

( * ) Notice: Subject to any disclaimer, the term of this patent is extended or adjusted under 35 U.S.C. 154(b) by 454 days.

(21) Appl. No.: 13/203,860

(22) PCT Filed: Mar. 16, 2010

(86) PCT No.: PCT/JP2010/054410
§ 371 (c)(1),
(2), (4) Date: Aug. 30, 2011

(87) PCT Pub. No.: WO2010/107017
PCT Pub. Date: Sep. 23, 2010

(65) Prior Publication Data
US 2011/0311216 A1    Dec. 22, 2011

(30) Foreign Application Priority Data

Mar. 19, 2009   (JP) ................................. 2009-068004

(51) Int. Cl.
*H04J 14/02*    (2006.01)
(52) U.S. Cl.
USPC ................... 398/94; 398/10; 398/14; 398/34
(58) Field of Classification Search
CPC ......................... H04J 14/0221; H04B 10/0771
USPC .......................................... 398/10, 14, 34, 94
See application file for complete search history.

(56) References Cited

U.S. PATENT DOCUMENTS

| | | | |
|---|---|---|---|
| 6,023,366 A | 2/2000 | Kinoshita | |
| 2001/0038488 A1* | 11/2001 | Kinoshita | ................ 359/341.41 |
| 2002/0015202 A1 | 2/2002 | Michishita et al. | |
| 2002/0024715 A1 | 2/2002 | Garner et al. | |
| 2005/0213980 A1* | 9/2005 | Ota | ................................. 398/84 |

FOREIGN PATENT DOCUMENTS

| | | |
|---|---|---|
| EP | 1503533 A2 | 2/2005 |
| JP | 09-321701 A | 12/1997 |

(Continued)

OTHER PUBLICATIONS

Office Action dated Oct. 25, 2013, issued by the State Intellectual Property Office of the People's Republic of China in counterpart Chinese Application No. 201080010027.9.

*Primary Examiner* — Leslie Pascal
(74) *Attorney, Agent, or Firm* — Sughrue Mion, PLLC

(57) ABSTRACT

The present invention enables to prevent transmission characteristics from deteriorating due to the nonlinear effect in the transmission path caused by an increase in the channel power when a cable disconnection occurs. An optical signal level adjustment method comprises the steps of: obtaining, based on one or more optical signal disconnections which are detected per wavelength block and each of which is detected by a signal disconnection detection section included in each of terminal station devices, a location at which the optical signal disconnection has occurred, a combination of a terminal station device and a wavelength block, and a dummy light adjustment amount, said combination being required to be subjected to adjustment of transmission dummy light, said combination and said dummy light adjustment amount corresponding to the location; and transmitting, to the terminal station device which is required to be subjected to adjustment of the transmission dummy light, a control signal for adjusting the intensity of the dummy light in the obtained wavelength block by the dummy light adjustment amount.

18 Claims, 7 Drawing Sheets

(56) References Cited

FOREIGN PATENT DOCUMENTS

| JP | 10-150433 A | 6/1998 |
| JP | 2000-174701 A | 6/2000 |
| JP | 2002-051013 A | 2/2002 |
| JP | 2005-051596 A | 2/2005 |
| JP | 2005-051598 A | 2/2005 |
| JP | 2006-066946 A | 3/2006 |

* cited by examiner

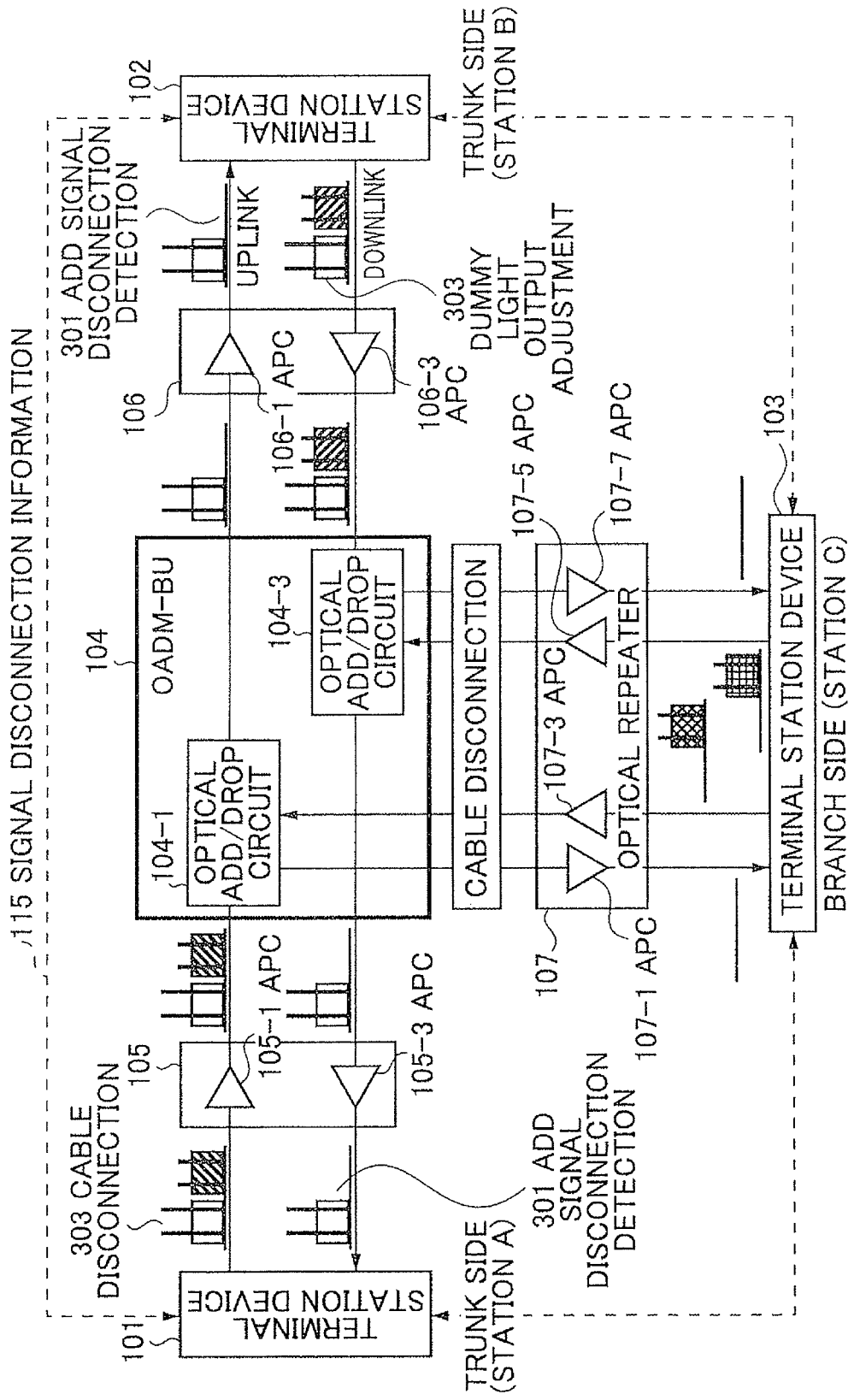

FIG.6

| FAULT PATTERN No. | FAULT ZONE | STATION A | | STATION B | | STATION C (OPPOSED TO STATION A) | | STATION C (OPPOSED TO STATION B) | |
|---|---|---|---|---|---|---|---|---|---|
| | | SHORT-WAVE BAND | LONG-WAVE BAND | SHORT-WAVE BAND | LONG-WAVE BAND | SHORT-WAVE BAND | LONG-WAVE BAND | SHORT-WAVE BAND | LONG-WAVE BAND |
| 1 | BETWEEN BU AND STATION C | ○ | × | ○ | × | × | × | × | × |
| 2 | BETWEEN BU AND STATION A | × | × | × | ○ | × | × | ○ | ○ |
| 3 | BETWEEN BU AND STATION B | × | ○ | × | × | ○ | ○ | × | × |
| 4 | BETWEEN BU AND STATION C (ONLY LEFT SIDE TWO PATHS) | ○ | ○ | ○ | × | × | × | ○ | ○ |
| 5 | BETWEEN BU AND STATION C (ONLY RIGHT SIDE TWO PATHS) | ○ | × | ○ | ○ | ○ | ○ | × | × |
| 6 | BETWEEN BU AND STATION A (ONLY UPLINK) | ○ | ○ | × | ○ | × | × | ○ | ○ |
| 7 | BETWEEN BU AND STATION A (ONLY DOWNLINK) | × | × | ○ | ○ | ○ | ○ | ○ | ○ |
| 8 | BETWEEN BU AND STATION B (ONLY UPLINK) | ○ | ○ | × | × | ○ | ○ | ○ | ○ |
| 9 | BETWEEN BU AND STATION B (ONLY DOWNLINK) | × | ○ | ○ | ○ | ○ | ○ | × | × |
| 10 | BETWEEN BU AND STATION C (ONLY LEFT END PATH) | ○ | ○ | ○ | ○ | × | × | ○ | ○ |
| 11 | BETWEEN BU AND STATION C (ONLY SECOND PATH FROM LEFT END) | ○ | ○ | ○ | × | ○ | ○ | ○ | ○ |
| 12 | BETWEEN BU AND STATION C (ONLY THIRD PATH FROM LEFT END) | ○ | × | ○ | ○ | ○ | ○ | ○ | ○ |
| 13 | BETWEEN BU AND STATION C (ONLY RIGHT END PATH) | ○ | ○ | ○ | ○ | ○ | ○ | × | × |

FIG.7

| FAULT PATTERN No. | STATION A | | STATION B | | STATION C (OPPOSED TO STATION A) | | STATION C (OPPOSED TO STATION B) | |
|---|---|---|---|---|---|---|---|---|
| | SHORT-WAVE BAND | LONG-WAVE BAND | SHORT-WAVE BAND | LONG-WAVE BAND | SHORT-WAVE BAND | LONG-WAVE BAND | SHORT-WAVE BAND | LONG-WAVE BAND |
| 1 | xxdB UP | | xxdB UP | | | | | |
| 2 | | | | | | | | xxdB UP |
| 3 | | | | | | xxdB UP | | |
| 4 | xxdB UP | | | | | | | |
| 5 | | | xxdB UP | | | | | |
| 6 | | | | | | | | xxdB UP |
| 7 | | | | | | | | |
| 8 | | | | | | | | |
| 9 | | | | | | xxdB UP | | |
| 10 | | | | | | | | |
| 11 | xxdB UP | | | | | | | |
| 12 | | | xxdB UP | | | | | |
| 13 | | | | | | | | |

OPTICAL SIGNAL LEVEL ADJUSTMENT SYSTEM, INFORMATION ANALYSIS/CONTROL SIGNAL GENERATION APPARATUS IN THE SAME SYSTEM, AND INFORMATION ANALYSIS/CONTROL SIGNAL GENERATION METHOD

CROSS REFERENCE TO RELATED APPLICATIONS

This application is a National Stage of International Application No. PCT/JP2010/054410 filed Mar. 16, 2010, claiming priority based on Japanese Patent Application No. 2009-068004 filed Mar. 19, 2009 the contents of all of which are incorporated herein by reference in their entirety.

TECHNICAL FIELD

The present invention relates to an optical signal level adjustment system, an information analysis/control signal generation apparatus in the system, and an information analysis/control signal generation method and, more particularly, to an optical signal level adjustment system, an information analysis/control signal generation apparatus in the system, and an information analysis/control signal generation method capable of being applied to an optical submarine cable system and an onshore optical communication system.

BACKGROUND ART

In general, in order to achieve channel power management at the cable disconnection time, an optical repeater output is adjusted or a switch circuit is mounted in a BU (Branching Unit). However, these approaches require complicated circuit configuration and increase cost.

Patent Literature 1 discloses a technique in which a dummy light (ASE light) is disposed in a wavelength channel unallocated band, and the power of the dummy light is controlled at extension time to keep the optical power in the entire band at a constant level irrespective of the number of wavelengths to be multiplexed. Further, Patent Literature 2 discloses a technique in which the optical power of add light to be inserted is adjusted. Patent Literature 2 further discloses, as a third example, a configuration in which a signal level measured using an optical spectrum analyzer installed in a reception terminal station is analyzed so as to adjust the dummy light output.

CITATION LIST

Patent Literature

{PTL 1} JP-A-2005-051598
{PTL 2} JP-A-10-150433

SUMMARY OF INVENTION

Technical Problem

However, the above Patent Literatures do not describe a countermeasure against a change in the optical power due to occurrence of a failure.

Further, in Patent Literature 1, an optical add drop multiplexing-branching unit is not included in the configuration and thus a method for compensating a difference between the signal levels on the trunk side and branch side is not described.

In a case where a cable disconnection occurs in a submarine cable system employing an optical add drop multiplexing-branching unit (hereinafter, referred to as OADM-BU), a signal to be inserted under normal circumstances is not multiplexed, the number of main signal channels is reduced. Since the output of a repeater in the submarine cable system is nearly constant, the reduction in the number of main signal channels leads to an increase in the channel power. When the channel power is increased, transmission characteristics deteriorate due to the nonlinear effect of a transmission path. Thus, the management of the main signal channel power at the time of occurrence of the cable disconnection is very important.

An object of the present invention is to provide an optical signal level adjustment system and an optical signal level adjustment method capable of preventing transmission characteristics from deteriorating due to the nonlinear effect in the transmission path caused by an increase in the channel power when a cable disconnection occurs.

Solution to Problem

According to a first aspect of the present invention, there is provided an optical signal level adjustment method comprising the steps of: obtaining, based on one or more optical signal disconnections which are detected per wavelength block and each of which is detected by a signal disconnection detection section included in each of terminal station devices, a location at which the optical signal disconnection has occurred, a combination of a terminal station device and a wavelength block, and a dummy light adjustment amount, said combination being required to be subjected to adjustment of transmission dummy light, said combination and said dummy light adjustment amount corresponding to the location; and transmitting, to the terminal station device which is required to be subjected to adjustment of the transmission dummy light, a control signal for adjusting the intensity of the dummy light in the obtained wavelength block by the dummy light adjustment amount.

According to a second aspect of the present invention, there is provided A terminal station device comprising: a device of detecting optical signal disconnection per wavelength block; a device for obtaining, based on one or more optical signal disconnections, each of which is detected by a signal disconnection detection section included in each of terminal station devices, a location at which the optical signal disconnection has occurred, a combination of a terminal station device and a wavelength block, and a dummy light adjustment amount, said combination being required to be subjected to adjustment of transmission dummy light, said combination and said dummy light adjustment amount corresponding to the location; a device for transmitting, to the terminal station device which is required to be subjected to adjustment of the transmission dummy light, a control signal for adjusting the intensity of the dummy light in the obtained wavelength block by the dummy light adjustment amount; and a dummy light generation/adjustment section for generating dummy light whose intensity has been adjusted for each wavelength block according to the control signal.

According to a third aspect of the present invention, there is provided a terminal station device comprising: a device of detecting optical signal disconnection per wavelength block; a device for obtaining, based on one or more optical signal disconnections, each of which is detected by a signal disconnection detection section included in each of terminal station devices, a location at which the optical signal disconnection has occurred, a combination of a terminal station device and a wavelength block, and a dummy light adjustment amount, said combination being required to be subjected to adjustment of transmission dummy light, said combination and said dummy light adjustment amount corresponding to the location; and a dummy light generation/adjustment section for generating dummy light whose intensity has been adjusted for each wavelength block according to a control signal which is sent from an information analysis/control signal generation apparatus for transmitting, to the terminal station device which is required to be subjected to adjustment of the transmission dummy light, the control signal for adjusting the intensity of the dummy light in the obtained wavelength block by the dummy light adjustment amount.

According to a fourth aspect of the present invention, there is provided an information analysis/control signal generation apparatus comprising: a device for obtaining, based on one or more optical signal disconnections which are detected per wavelength block and each of which is detected by a signal disconnection detection section included in each of terminal station devices, a location at which the optical signal disconnection has occurred, a combination of a terminal station device and a wavelength block, and a dummy light adjustment amount, said combination being required to be subjected to adjustment of transmission dummy light, said combination and said dummy light adjustment amount corresponding to the location; and a device for transmitting, to the terminal station device which is required to be subjected to adjustment of the transmission dummy light, a control signal for adjusting the intensity of the dummy light in the obtained wavelength block by the dummy light adjustment amount.

Advantageous Effects of Invention

According to the present invention, an increase in the channel power can be prevented at the time of occurrence of a cable disconnection, making it possible to prevent transmission characteristics from deteriorating due to the nonlinear effect in the transmission path.

BRIEF DESCRIPTION OF DRAWINGS

FIG. 5 A conceptual view illustrating a state where the intensity of a dummy light is adjusted when a cable disconnection occurs between an OADM-BU and a branch side terminal station device in the optical submarine cable system of FIG. 2.

FIG. 6 A view illustrating a part of a table used by an information analysis/control signal generation section of FIG. 2.

FIG. 7 A view illustrating the remaining part of the table used by an information analysis/control signal generation section of FIG. 2.

DESCRIPTION OF EMBODIMENTS

An exemplary embodiment for practicing the present invention will be described in detail below with reference to the accompanying drawings.

In a submarine cable system employing an OADM-BU, (1) a dummy light for relieving a main signal at cable disconnection time is disposed in a signal band, and (2) output of the dummy light is adjusted at the time of occurrence of a cable disconnection so as to suppress transmission characteristics of the main signal from deteriorating.

Figure 1:
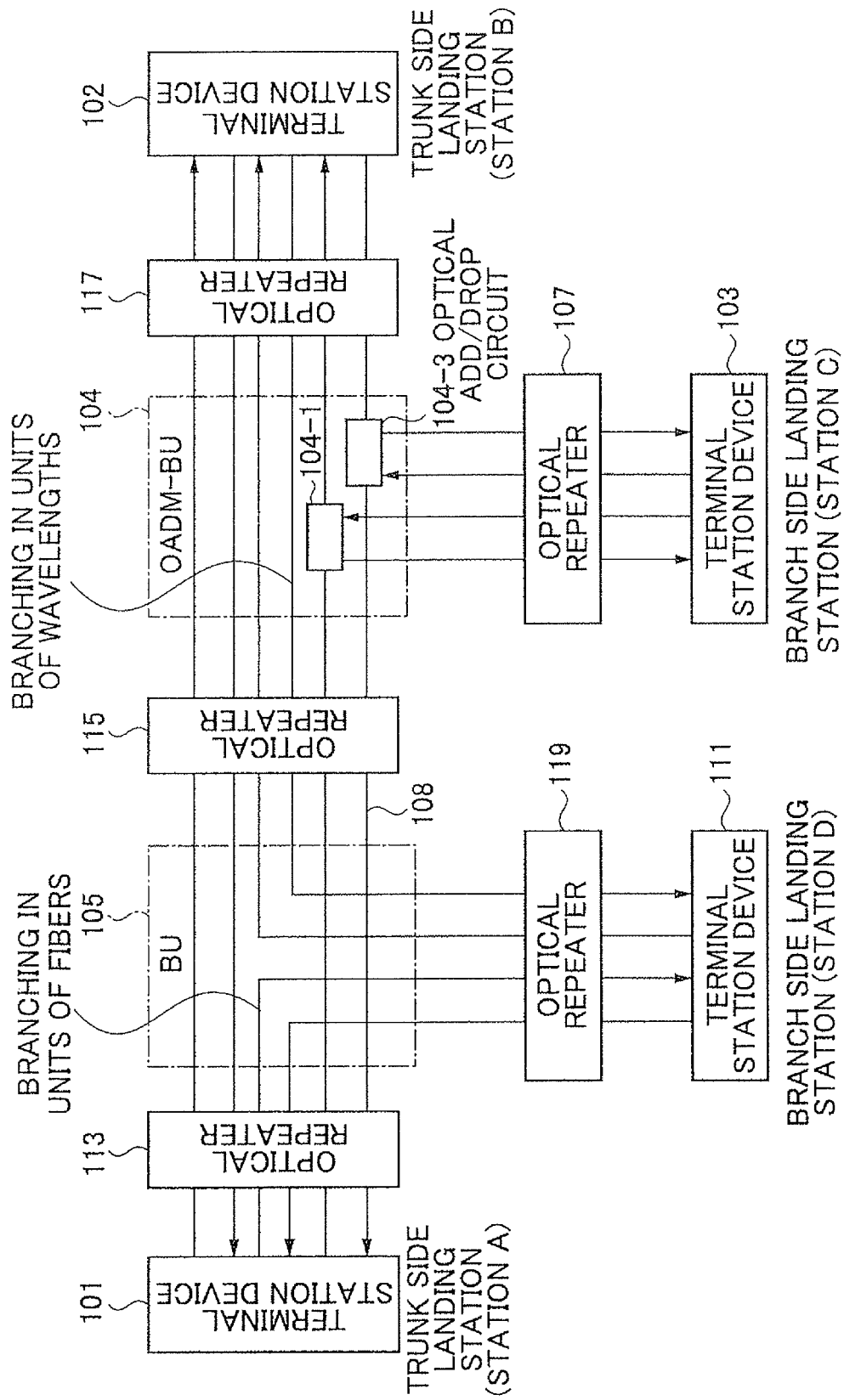
FIG. 1 A conceptual view illustrating an example of an optical submarine cable system.

An optical submarine cable system illustrated in FIG. 1 includes terminal station devices 101, 102, 103, and 111 which are installed in a landing station, and a transmission path 108, optical repeaters 113, 115, 117, 107, and 119, and BUs (Branching Units) 104 and 105 which are laid on the bottom of the sea. Landing stations (station A, station B) 101 and 102 which directly transmit/receive optical signal without branching it are each referred to as "a trunk station", and landing stations (station C, station D) 103 and 111 which transmit/receive a branched signal are each referred to as "a branch station".

The BU includes a type that branches a signal in units of fibers and a type that inserts/branches a signal in units of wavelengths, and the latter is referred to as "OADM-BU". The OADM-BU, which is generally known, can insert/branch only a signal of a desired wavelength, thus minimizing the number of terminal station devices to be installed in the landing station, which may be advantageous in terms of cost.

Figure 2:
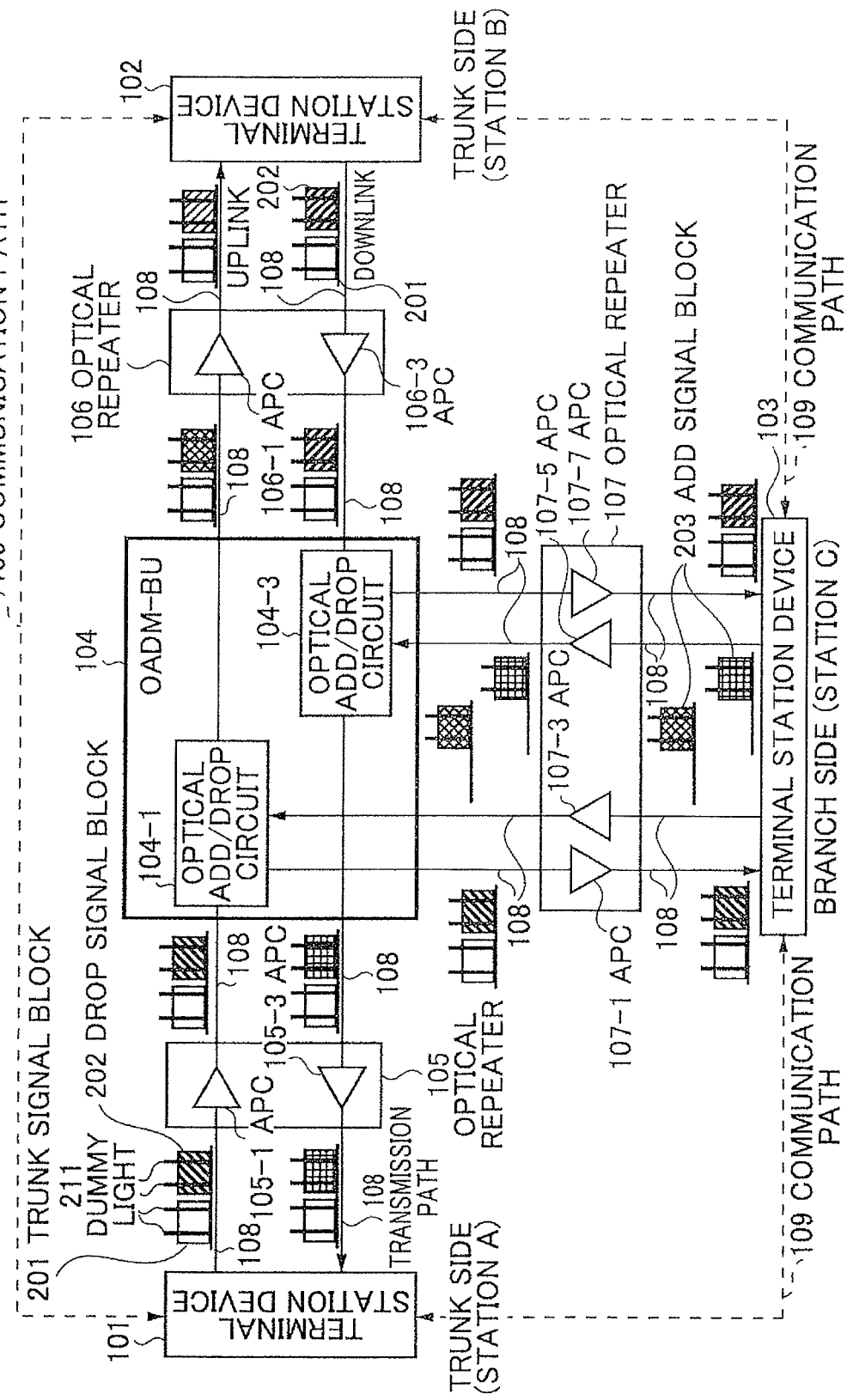
FIG. 2 A conceptual view illustrating an optical submarine cable system having a configuration for explaining the present invention.

FIG. 2 illustrates an optical submarine cable system according to an exemplary embodiment of the present invention. The optical submarine cable system according to the present exemplary embodiment includes a terminal station device 101 installed at one trunk station (station A), a terminal station device 102 installed at the other trunk station (station B), an onshore terminal station device 103 installed at a branch station (station C), an OADM-BU 104 that adds/drops a wavelength-multiplexed optical signal in units of wavelength bands, a transmission path 108 through which an optical signal propagates, optical repeaters 105, 106, and 107 that compensate the loss of the optical signal propagating through the transmission path 108, and a communication path 109 used for connecting the onshore terminal station devices 101, 102, and 103 so as to allow the devices 101, 102, and 103 to exchange information with one another.

The OADM-BU 104 includes optical Add/Drop circuits 104-1 and 104-3 that branch a signal from the trunk side and multiplex a signal from the branch side.

Figure 3:
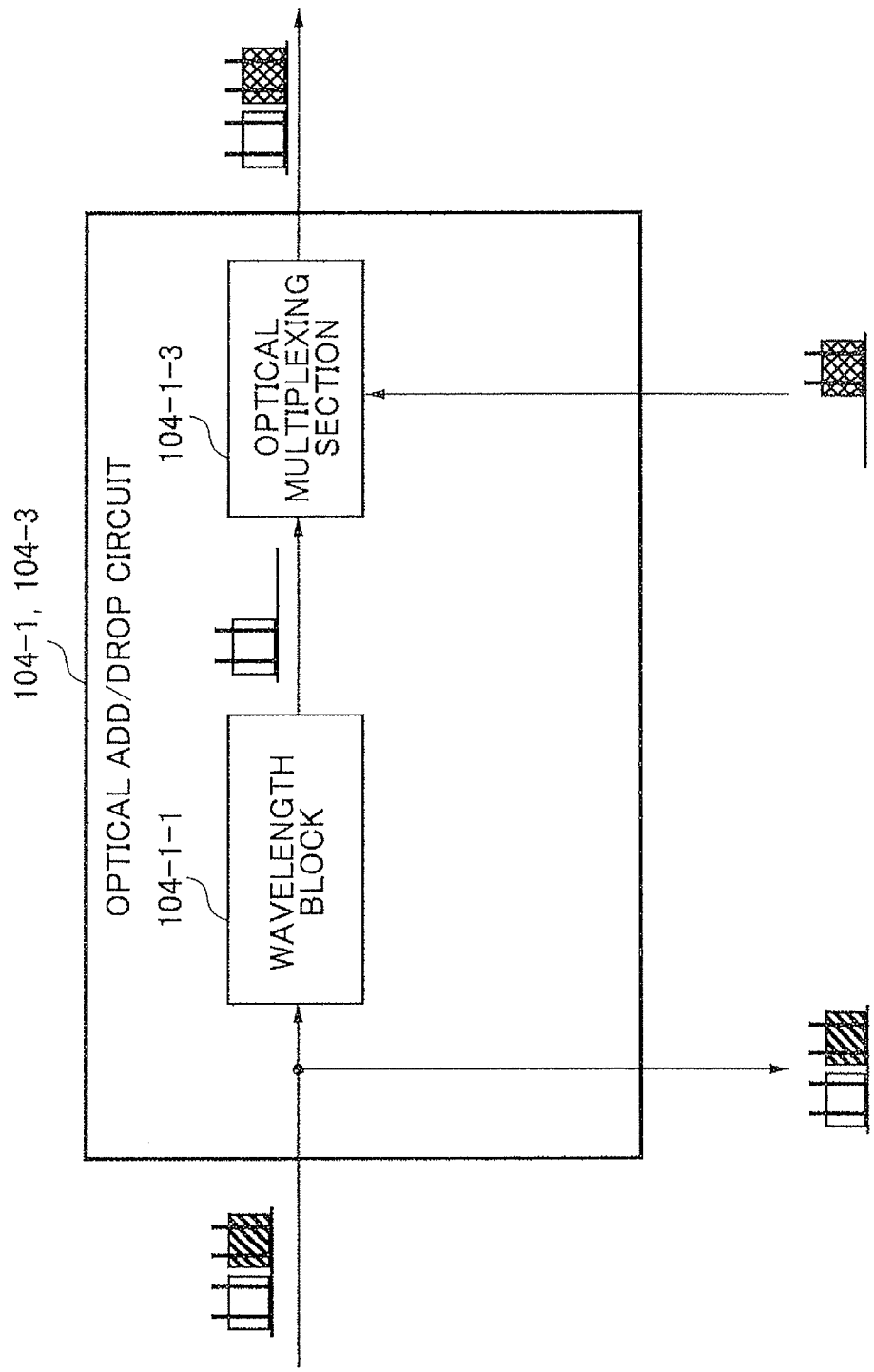
FIG. 3 A block diagram illustrating a configuration of an optical Add/Drop circuit of FIG. 2.

As illustrated in FIG. 3, the optical Add/Drop circuits 104-1 and 104-3 each include a wavelength blocker 104-1-1 and an optical multiplexing section 104-1-3. The wavelength blocker 104-1-1 is generally a band blocking filter; however, in the example of FIG. 3, the wavelength blocker 104-1-1 serves as a high-band filter for blocking an optical signal of a long wavelength block (long wavelength band). In the example of FIG. 3, the optical multiplexing section 104-1-3 synthesizes an optical signal of a short wavelength block (short wavelength band) and an optical signal of a long wavelength block.

A signal includes a trunk signal wavelength band (trunk signal block) 201 transmitted/received between the terminal station devices 101 and 102, a Drop signal wavelength band (Drop signal block) which is transmitted from the terminal station device 101 of the trunk station, branched by the OADM-BU 104, and received by the terminal station device 103 of the branch station, and an Add signal wavelength band (Add signal block) 203 which is transmitted from the terminal station device 103 of the branch station, multiplexed by the OADM-BU 104, and received by the terminal station devices 101 and 102 of the trunk station. Further, a dummy light 211 is generated by the onshore terminal station devices 101, 102, and 103 and disposed in each signal wavelength band (signal block). A plurality of dummy lights may be disposed. The advantage obtained by disposing a plurality of dummy lights is that the optical power per one dummy light can be reduced.

The optical repeaters 105, 106, and 107 each have APCs (Automatic Pump Power Controllers) 105-1 and 105-3. Each APC keeps the level of excitation light output constant, thereby outputting an optical signal with nearly constant power.

Figure 4:
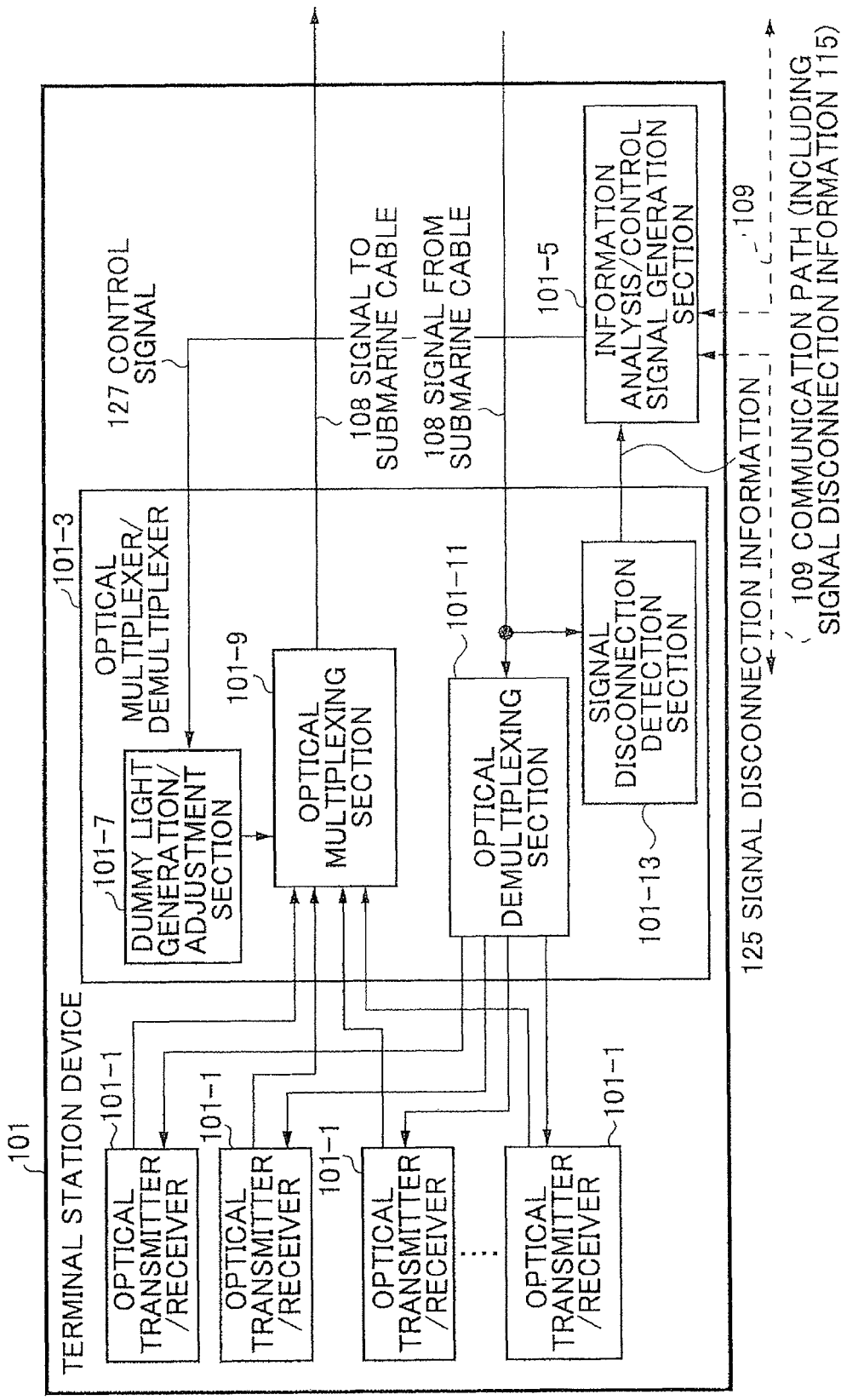
FIG. 4 A block diagram illustrating a configuration of a terminal station device of FIG. 2.

FIG. 4 illustrates an example of a configuration of the terminal station device 101 (102, 103). The terminal station device includes a dummy light generation/adjustment section 101-7, that generates a dummy light and adjusts power of its output, a signal disconnection detection section 101-13 that detects a disconnection (signal disconnection) of an optical signal from a submarine cable in units of wavelength blocks (referred to also as "sub-bands"), an information analysis/control signal generation section 101-5 that analyzes signal disconnection information from the signal disconnection detection section 101-13 of each of the terminal station devices 101, 102, and 103 and generates a signal for output control of the dummy light, an optical transmitter/receiver 101-1 that transmits/receives an optical signal, an optical multiplexing section 101-9 that multiplexes (wavelength-division-multiplexes) the optical signals from the optical transmitters/receivers 101-1 and dummy light from the dummy light generation/adjustment section 101-7 and sends the resultant signal to the submarine cable, and an optical demultiplexing section 101-11 that demultiplexes (wavelength-division-demultiplexes) a signal from the submarine cable and sends the resultant signal to the optical transmitters/receivers 101-1.

The signal disconnection detection section 101-13 has an optical spectrum analyzer function and determines occurrence of the signal disconnection when no signal exists in each signal wavelength band.

The dummy light generation/adjustment section 101-7, optical multiplexing section 101-9, optical demultiplexing section 101-11, and signal disconnection detection section 101-13 constitute an optical multiplexer/demultiplexer 101-3.

It is sufficient to provide only one information analysis/control signal generation section 101-5 in any one of the terminal station devices 101, 102, and 103. Alternatively, the information analysis/control signal generation section 101-5 may be provided as an independent device. Although a control signal 127 is sent to the same terminal station device as that includes the information analysis/control signal generation section 101-5 in the example of FIG. 4, the present exemplary embodiment is not limited to this, but the control signal 127 may be sent to any one of the terminal station devices 101, 102, and 103. That is, the information analysis/control signal generation section 101-5 collects the signal disconnection information from the signal disconnection detection sections 101-13 of all the terminal station devices to be managed, analyzes the collected information to obtain (i) a combination of a terminal station device requiring intensity adjustment of the dummy light and a wavelength block and (ii) adjustment amount required, and transmits information concerning the obtained wavelength block and adjustment amount to the dummy light generation/adjustment section 101-7 of the terminal station device which is required to adjust intensity of the dummy light. A concrete example of the operation of the information analysis/control signal generation section 101-5 will be described later.

Although the dummy light has conventionally been used, the main use purpose thereof is to compensate for the shortfall of the optical signal in a case where the number of the optical transmitter/receivers 101-1 in operation is small.

In the example of FIG. 5, by giving power to a signal wavelength band that is not input to the OADM-BU 104 due to a cable disconnection, it is possible to keep the channel power of a main signal which is output from the OADM-BU 104 and amplified by the optical repeaters 105 and 106 of latter stage at a constant level. The dummy light adjusted at this time is the dummy light existing in the wavelength block of the main signal. The dummy light adjusted is not disposed in the station on the side at which the cable disconnection has occurred but disposed on the side different from the cable disconnection side.

The adjustment of the dummy light is performed by the optical transmission terminal station devices 101 and 102 installed respectively in the landing stations.

A concrete procedure will be described below taking a branch side cable disconnection as illustrated in FIG. 5 as an example.

1) The terminal station devices 101 and 102 each detect, using the signal disconnection detection section 101-13 provided therein, absence of a signal (Add signal) from the terminal station device 103 which should normally be acquired.

2) In this example, the information analysis/control signal generation section 101-5 of the terminal station device 101 is used. In this case, the signal disconnection detection section 101-13 of the terminal station device 101 and signal disconnection detection section 101-13 of the terminal station device 102 each transmit signal disconnection information 125 to the information analysis/control signal generation section 101-5 of the terminal station device 101.

3) The information analysis/control signal generation section 101-5 of the terminal station device 101 analyzes the signal disconnection information so as to identify a cable disconnection zone and then transmits control signals 127 to the dummy light generation/adjustment section 101-7 of the terminal station device 101 and the dummy light generation/adjustment section 101-7 of the terminal station device 102.

4) The dummy light generation/adjustment section 101-7 of the terminal station device 101 and the dummy light generation/adjustment section 101-7 of the terminal station device 102 that have received the instructions change the power of the dummy lights.

If the power of the dummy light is not changed for adjustment, then the wavelength block on one side disappears, whereby the total power obtained after multiplex in the OADM-BU 104 is decreased by the amount of disappeared signal wavelength band. However, when the power of the dummy light is changed for adjustment, the reduction in the power can be compensated. This can prevent optical signals from being excessively amplified by the APCs of the repeaters 105 and 106, thereby preventing the transmission characteristics from deteriorating due to the nonlinear effect of a transmission path.

In a case where a plurality of dummy lights are disposed in the same wavelength block, required power may be evenly distributed to the plurality of dummy lights. For example, in a case where a large number of signal wavelengths disappear due to a cable disconnection and thus the power to be compensated is large, disposition of the plurality of dummy lights reduces a load on the dummy light per one wave.

In a branch side cable disconnection as illustrated in FIG. 5, it is assumed that the ratio between (i) the power of the trunk signal and dummy light disposed in the trunk signal band and (ii) the power of the Add/Drop signal and dummy light disposed in the Add/Drop signal band is n:m. Further, it is assumed that the total power obtained by multiplexing (i) the trunk signal and dummy light disposed in the trunk signal band and (ii) Add/Drop signal and dummy light disposed in the Add/Drop signal band is P_t [mW].

The absolute amount Δ of the power reduced when the signal (Add signal and dummy light disposed in the Add signal band) on the branch side disappears is represented in linear scale as follows:

$$\Delta = (P\_t * m)/(m+n)[mW]$$

In a case where the power of all the dummy lights to be controlled is evenly adjusted assuming that the output power per one dummy light before adjustment is P_d [mW], the number of dummy light sources to be controlled is d, the ratio between the power of one dummy light after adjustment and power of one dummy light before adjustment is represented in linear scale as follows:

$$(P\_d + (\Delta/d))/P\_d = 1 + (P\_t * m)/(P\_d * (m+n) * d)$$

The intensity of the Add signal transmitted from the terminal station device 103 and Drop signal transmitted from each of the terminal station devices 101 and 102 are adjusted to be equal to each other in the initial stage of construction of the submarine cable system.

In case where the ratio between the trunk signal and Add/Drop signal is fixed, the location at which the cable disconnection has occurred and adjustment amount of the dummy light can uniquely be determined. Thus, by giving the information analysis/control signal generation section 101-5 data in which the adjustment amount of the dummy light is previously set for each location of occurrence of the cable disconnection, it is possible to reduce processing time required for the control.

As the dummy light, a CW (Continuous Wave) dummy light or an ASE (Amplified Spontaneous Emission) dummy light may be used.

In lieu of adjusting the output of the dummy light, another dummy light may be added.

In the example of FIG. 5, only the intensity of the dummy light disposed in the trunk signal block is increased; however, in this case, the intensity of a utilized optical signal in the output of the APCs of the optical repeaters 105 and 106 may be reduced to fall below an allowable range. To avoid this, the dummy light disposed in the drop signal block is reduced in intensity or eliminated.

Next, details of operation of the information analysis/control signal generation section 101-5 will be described.

The information analysis/control signal generation section 101-5 has tables as illustrated in FIGS. 6 and 7.

The table of FIG. 6 is a table representing a relation between a fault zone and a combination of signal disconnections, each of which occurs or does not occur in each wavelength block (or each wavelength band) of each input of each terminal station device (or station). This combination is referred to as "fault pattern". FIG. 7 is a table representing, for each fault pattern, one or more wavelength blocks (or wavelength bands), if any, which is required to be subjected to adjustment of the intensity of the dummy lights and each of which is present at an output of a terminal station device (or station). The table in FIG. 7 also represents, for each fault pattern, adjustment amount of the dummy light for each of wavelength blocks which are required to be subjected to adjustment of the intensity of the dummy lights. In the table of FIG. 7, all the adjustment amounts are expressed as "xxdB"; however, the actual adjustment amount is obtained according to the same calculation as that described above and is previously calculated and written in the table of FIG. 7.

Thus, when detecting any of the fault patterns of FIG. 6, the information analysis/control signal generation section 101-5 transmits, to one or more terminal station devices each including the dummy light generation/adjustment section 101-7 which is required to adjust the intensity of the dummy light, both of information for identifying the dummy light generation/adjustment section 101-7 which is required to execute the adjustment and information representing the adjustment amount of the dummy light according to the table of FIG. 7.

FIG. 5 illustrates a case where fault pattern No. 1 has occurred. In FIG. 5, fault zone is present between the terminal station device (station C) 103 and OADM-BU 104. In this case, signal disconnections take place in long-wave band at terminal station device (station A) 101, in long-wave band at terminal station device (station B) 102, in short-wave band and long-wave band at station A opposed side of terminal station device (station C) 103, and in short-wave band and long-wave band at station B opposed side of terminal device (station C) 103. This combination of signal disconnections is detected, and fault pattern No. 1 which corresponds to this combination is identified with reference to the table in FIG. 6. After identifying fault pattern No. 1, with reference to the table in FIG. 7, information for increasing the intensity of the dummy light in short-wave band by xxdB at an output of the terminal station device (station A) 101 is sent to the terminal station device (station A) 101, and information for increasing the intensity of the dummy light in short-wave band by xxdB at an output of the terminal station device (station B) 102 is sent to the terminal station device (station B) 102.

If, fault zone is present between the terminal station device (station A) 101 and OADM-BU 104, signal disconnections take place in short-wave band long-wave band at terminal station device (station A) 101, in short-wave band at terminal station device (station B) 102, and in short-wave band and long-wave band at station A opposed side of terminal station device (station C) 103. If this combination of signal disconnections is detected, and fault pattern No. 2 which corresponds to this combination is identified with reference to the table in FIG. 6. After identifying fault pattern No. 2, with reference to the table in FIG. 7, information for increasing the intensity of the dummy light in long-wave band by xxdB at a station B opposed side output of the terminal station device (station C) 103 is sent to the terminal station device (station C) 103.

Although the exemplary embodiment of the present invention has been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

This application is based upon and claims the benefit of priority from prior Japanese Patent Application No. 2009-068004 (filed Mar. 19, 2009) under the Paris Convention, the entire contents of which are incorporated herein by reference.

INDUSTRIAL APPLICABILITY

The present invention can be used in an optical submarine cable system or an onshore optical communication system.

REFERENCE SIGNS LIST 101, 102, 103: Terminal station device
101-1: Optical transmitter/receiver
101-3: Optical multiplexer/demultiplexer 101-5: Information analysis/control signal generation section
101-7: Dummy light generation/adjustment section
101-9: Optical multiplexing section
101-11: Optical demultiplexing section
101-13: Signal disconnection detection section
104: OADM-BU
105, 106, 107: Optical repeater
105-1, 105-3: APC
108: Transmission path
201: Trunk signal block
202: Drop signal block
203: Add signal block

The invention claimed is:

1. An optical signal level adjustment method comprising
obtaining a fault pattern representing optical signal connection or optical signal disconnection at each wavelength block of each input of each terminal station device;
obtaining one or more combinations corresponding to the fault pattern, each of said combinations representing a place where adjustment of transmission dummy light is required, and including a wavelength block, and a terminal station device as items for identifying the place;
obtaining a dummy light adjustment amount for each of said combinations, said dummy light adjustment amount corresponding to the fault pattern; and
transmitting, to the terminal station device, which is included in each of said combinations, a control signal for adjusting the intensity of the dummy light in the wavelength block, which is included in each of said combinations, at an output by the dummy light adjustment amount for each of said combinations.

2. The optical signal level adjustment method according to claim 1, further comprising detecting the optical signal connection or the optical signal disconnection at each wavelength block of each output of each terminal station device, by a signal disconnection detection section of each of the terminal station devices.

3. The optical signal level adjustment method according to claim 1, further comprising generating dummy light whose intensity has been adjusted in the wavelength block at the output included in the combination by the dummy light adjustment amount according to the control signal.

4. The optical signal level adjustment method according to claim 3, wherein the number of the dummy light sources is adjusted in lieu of adjusting the intensity of the dummy light.

5. The optical signal level adjustment method according to claim 1,
wherein said combination further includes an output as an additional item for identifying the place,
wherein the control signal is for adjusting the intensity of the dummy light in the wavelength block, which is included in each of said combinations, at the output, which is included in each of said combinations, by the dummy light adjustment amount for each of said combinations.

6. A terminal station device comprising:
a device for detecting optical signal connection or optical signal disconnection per wavelength block of each output;
a device for obtaining a fault pattern representing optical signal connection or optical signal disconnection at each wavelength block of each input of each terminal station device;
a device for obtaining one or more combinations corresponding to the fault pattern, each of said combinations representing a place where adjustment of transmission dummy light is required, and including a wavelength block, and a terminal station device as items for identifying the place;
a device for obtaining a dummy light adjustment amount for each of said combinations, said dummy light adjustment amount corresponding to the fault pattern;
a device for transmitting, to the terminal station device, which is included in each of said combinations, a control signal for adjusting the intensity of the dummy light in the wavelength block, which is included in each of said combinations, at an output by the dummy light adjustment amount for each of said combinations; and
a dummy light generation/adjustment section for generating dummy light whose intensity has been adjusted in the wavelength block at the output included in the combination by the dummy light adjustment amount according to the control signal.

7. The terminal station device according to claim 6, wherein the dummy light generation/adjustment section adjusts the number of the dummy light sources in lieu of adjusting the intensity of the dummy light.

8. The terminal station device according to claim 6,
wherein said combination further includes an output as an additional item for identifying the place,
wherein the control signal is for adjusting the intensity of the dummy light in the wavelength block, which is included in each of said combinations, at the output, which is included in each of said combinations, by the dummy light adjustment amount for each of said combinations.

9. A terminal station device comprising:
a device for detecting optical signal connection or optical signal disconnection per wave length block of each output;
a device for obtaining a fault pattern representing optical signal connection or optical signal disconnection at each wavelength block of each input of each terminal station device;
a device for obtaining one or more combinations corresponding to the fault pattern, each of said combinations representing a place where adjustment of transmission dummy light is required, and including a wavelength block, and a terminal station device as items for identifying the place;
a device for obtaining a dummy light adjustment amount for each of said combinations, said dummy light adjustment amount corresponding to the fault pattern; and
a dummy light generation/adjustment section for generating dummy light whose intensity has been adjusted in the wavelength block at the output included in the combination by the dummy light adjustment amount according to a control signal which is sent from an information analysis/control signal generation apparatus for transmitting, to the terminal station device, which is included in each of said combinations, the control signal for adjusting the intensity of the dummy light in the wavelength block, which is included in each of said combinations, at an output by the dummy light adjustment amount for each of said combinations.

10. The terminal station device according to claim 9, wherein the dummy light generation/adjustment section adjusts the number of the dummy light sources in lieu of adjusting the intensity of the dummy light.

11. The terminal station device according to claim 9,
wherein said combination further includes an output as an additional item for identifying the place, wherein the control signal is for adjusting the intensity of the dummy light in the wavelength block, which is included in each of said combinations, at the output, which is included in each of said combinations, by the dummy light adjustment amount for each of said combinations.

12. An information analysis/control signal generation apparatus comprising:
 a device for obtaining a fault pattern representing optical signal connection or optical signal disconnection at each wavelength block of each input of each terminal station device;
 a device for obtaining one or more combinations corresponding to the fault pattern, each of said combinations representing a place where adjustment of transmission dummy light is required, and including a wavelength block, and a terminal station device as items for identifying the place;
 a device for obtaining a dummy light adjustment amount for each of said combinations, said dummy light adjustment amount corresponding to the fault pattern; and
 a device for transmitting, to the terminal station device, which is included in each of said combinations, a control signal for adjusting the intensity of the dummy light in the wavelength block, which is included in each of said combinations, at an output by the dummy light adjustment amount for each of said combinations.

13. An optical signal level adjustment system comprising:
 the information analysis/control signal generation apparatus as claimed in claim 12; and
 terminal station devices.

14. The optical signal level adjustment system according to claim 13, wherein the terminal station devices each comprise a dummy light generation/adjustment section that generates the dummy light whose intensity has been adjusted in the wavelength block at the output included in the combination by the dummy light adjustment amount according to the control signal.

15. The optical signal level adjustment system according to claim 14, wherein
 the number of the dummy light sources is adjusted in lieu of adjusting the intensity of the dummy light.

16. The optical signal level adjustment system according to claim 13, further comprising a branching apparatus having an optical add/drop multiplexing function.

17. The information analysis/control signal generation apparatus according to claim 13, wherein the terminal station devices each comprise a device for detecting optical signal connection or optical signal disconnection per wavelength block of each output.

18. The information analysis/control signal generation apparatus according to claim 12,
 wherein said combination further includes an output as an additional item for identifying the place,
 wherein the control signal is for adjusting the intensity of the dummy light in the wavelength block, which is included in each of said combinations, at the output, which is included in each of said combinations, by the dummy light adjustment amount for each of said combinations.

\* \* \* \* \*